United States Patent Office 3,631,150
Patented Dec. 28, 1971

3,631,150
SYNERGISTIC COMPOSITION FOR CURING POLYEPOXIDES COMPRISING AN IMIDAZOLE COMPOUND AND DICYANDIAMIDE
Gary M. Green, Concord, Calif., assignor to The Dexter Corporation, Hysol Division, Pittsburg, Calif.
No Drawing. Continuation-in-part of application Ser. No. 627,665, Apr. 3, 1967. This application May 20, 1970, Ser. No. 39,155
Int. Cl. C08g 30/14
U.S. Cl. 260—47 EN  7 Claims

ABSTRACT OF THE DISCLOSURE

The disclosure describes a new process and composition resulting therefrom for curing polyepoxides by mixing and reacting the polyepoxides at elevated temperatures with a mixture of dicyandiamide and an imidazole compound. The disclosure further describes a process for utilizing the composition in the preparation of fast curing adhesives.

The present application is a continuation-in-part of U.S. application, Ser. No. 627,665, filed on Apr. 3, 1967, now abandoned.

BACKGROUND OF THE INVENTION

This invention relates to a process for curing polyepoxides and the composition thereof. Specifically, the invention provides a new process of curing and resinifying polyepoxides containing a plurality of vic-epoxy groups, and preferably a glycidyl polyether of a polyhydric phenol or a polyhydric alcohol, by mixing and reacting the polyepoxide at elevated temperatures with a mixture of dicyandiamide and an imidazole compound.

It is known in the prior art, see for example, U.S. Pat. No. 3,356,645, to Warren that imidazole compounds may be used to cure epoxy resins. However, the use of imidazole compounds in curing epoxy resins result in adhesive compositions of limited stability or pot life, so that working time is short. It is also well known that a polyepoxide composition cured with dicyandiamide results in an adhesive with a long term stability or pot life, but requires high, impractical temperatures for cure. It has now been discovered that mixtures of dicyandiamide and imidazole compounds, when used to cure a polyepoxide, produce a polyepoxide having long term stability or pot life which will cure at a practical curing temperature significantly faster than when cured with dicyandiamide alone or with an imidazole compound alone. Adhesives containing dicyandiamide and 2-ethyl-4-methylimidazole, for example, are able to be cured in 8 to 10 minutes at 250° F., while the same composition without the dicyandiamide cures in 2 hours at 250° F. and the same composition without the 2-ethyl-4-methylimidazole cures in 16 hours at 250° F. In addition, such compositions have extended stability or pot life at temperatures as high as 75° F. These compositions having such superior properties are ideally suited for use in making elevated temperature adhesives for metal, glass and the like.

The above-noted discovery was quite unexpected as the result is far in excess of what might be expected by the individual components added in the same amounts. The combination thus gives true unexpected synergistic action as demonstrated in the examples at the end of the specification.

SUMMARY OF THE INVENTION

The present invention relates to a process for curing a polyepoxide comprising mixing and reacting 100 parts by weight of a polyepoxide with from 1 to 40 parts of dicyandiamide in the presence of from 0.1 to 12 parts by weight of an imidazole compound.

The invention also relates to an adhesive composition comprising a mixture of 100 parts by weight of a polyepoxide, 1 to 40 parts by weight of dicyandiamide and from 0.1 to 12 parts by weight of an imidazole compound.

The invention further relates to a method for bonding sheets of material by applying the adhesive composition as described above to the surface of one of the sheets, interposing the other sheet and curing at a temperature over 200° F.

DESCRIPTION OF THE PREFERRED EMBODIMENT

The polyepoxides to be used in the new process of the invention comprise those materials possessing more than one and preferably at least two vicinal epoxy groups, i.e.,

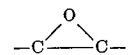

groups. These compounds may be saturated, unsaturated, aliphatic, cycloaliphatic, aromatic or heterocyclic and may be substituted with substituents, such as chlorine, ether radicals and the like which do not interfere with the proper cure. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,2-dicarboxylate,
di(4,5-epoxyoctadecyl)malonate.

Another group of the epoxy containing materials include those epoxidized esters of unsaturated alcohols and unsaturated carboxylic acids, such as 2,3-epoxybutyl-3,4-epoxypentanoate,
3,4-epoxyhexyl 3,4-epoxyhexyl 3,4-epoxypentanoate,
3,4-epoxycyclohexyl 3,4-epoxycyclohexanoate,
3,4-epoxycyclohexyl 4,5-epoxyoctanoate,
2,3-epoxycyclohexylmethyl epoxycyclohexane carboxylate.

Still another group of the epoxy-containing materials included epoxidized derivtaives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxyeiconsanedioate,
dihexyl 6,7,10,11-diepoxyhexadecanedioate,
didecyl 9-epoxyethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2 dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers, butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polygydric phenols are obtained by reacting epichlorohydrin with the desired polyhydric phenols in the presence of alkali. Polyether A and Polyether B described in the above-noted U.S. 2,633,458 are good examples of polyepoxides of this type.

The compounds to be used as curing agents in the claimed process are dicyandiamide and imidazole compounds. The amount of dicyandiamide to be used may vary over a wide range, depending on the polyepoxides selected, the type of application, etc. In general, amounts of the dicyandiamide can vary from about 1 to 40 parts by weight per 100 parts by weight of polyepoxide. Preferred amounts vary from about 1 to 20 parts diacyandiamide per 100 parts polyepoxide.

The imidazole compounds which may be used in the present invention include those of the formulae:

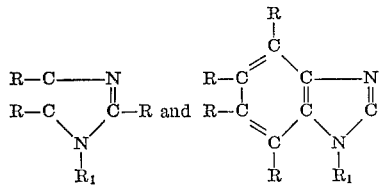

wherein R is hydrogen, halogen or an organic radical and $R_1$ is H or an organic radical, such as hydrocarbon radical or substituted hydrocarbon radical as the ester, ether, imide, amide, amino, halogen or mercapto-substituted hydrocarbon radical. Especially preferred are the imidazoles wherein R is hydrogen or a hydrocarbon radical, and preferably an alkyl, alkenyl, cycloalkyl, cycloalkenyl, aryl, alkaryl, or arylalkyl radicals, and particularly those containing no more than 15 carbon atoms. Examples of such compounds include, among others, imidazole, 2-ethyl-4-methylimidazole, 2,4-dioctyl imidazole, N-ethyl imidazole, N-butyl-2-ethyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole and mixtures thereof. Other examples include the salts and other derivatives of the above-noted imidazole compounds as their monocarboxylic acid salts, such as, for example, their acetate, benzoate, formate, phophate and lactate salts, etc.

A more detailed description of the chemistry of the imidazoles and benzimidazoles including their properties, preparation and structural formula is found in the book by Klaus Hofmann entitled "Imidazole and its Derivatives" published by Interscience Publishers, Inc., New York (1953).

The amounts of imidazole compound to be used may also vary within wide limits. Superior results are obtained when the amount of imidazole compound varies from about 0.1 to 12 parts by weight per 100 parts by weight of polyepoxide, and preferably from about 0.3 to 6 parts by weight per 100 parts by weight of polyepoxide.

In operating the process of the invention, one merely mixes the polyepoxide, dicyandiamide and imidazole compound together in the above-noted proportions and utilizes the resulting mixture in the desired application. The order of mixing may be varied as desired. It is sometimes preferred to mix the dicyandiamide and the imidazole compound together to form a stable curing agent composition and then, as desired, combine this mixture with the polyepoxide. It is also proper in some cases, to first mix the dicyandiamide with the polyepoxide and then add the imidazole compound.

The mixture of polyepoxide, dicyandiamide and imidazole compound is preferably employed in a mobile, spreadable condition. If the component or components are solids or very thick liquids, this may be accomplished by heating the mixture or by use of diluents or solvents. Various solvents or diluents may be employed. These may be volatile solvents which escape from the polyepoxide compositions by evaporation before or during the cure such as esters as ethyl acetate, butyl acetate, Cellosolve acetate (acetate of ethylene glycol monoethyl ether), methyl Cellosolve acetate (acetate of ethylene glycol monomethyl ether), etc., ether alcohols, such as methyl, ethyl or butyl ether of ethylene glycol or diethylene glycol; chlorinated hydrocarbons such as trichloropropane, chloroform. To save expense, these active solvents may be used in admixture with aromatic hydrocarbons such as benzene, toluene, xylene, etc. and/or alcohols such as ethyl, isopropyl, or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of polyhydric phenols in admixture with a normally liquid glycidyl polyether of a polyhydric alcohol. In fact, two or more of any of the polyepoxides may be used together as mixtures. In such case, the amount of the adduct added and commingled is based on the average epoxide equivalent weight of the polyepoxide mixture.

Other types of materials may also be included in the composition, such as fillers, as aluminum powder, asbestos, powdered mica, zinc dust, bentonite, ground glass fibers, Moneeta clay and the like, stabilizers, plasticizers, insecticides, fungicides, extenders, such as alkylated phenols as dinonyl phenol, coal tars, asphalts, road oils, extracts and distillates, middle oil, regined coal tar, pine tars, and the like, as well as other types of resins as phenol-aldehyde resins, phenol-urea resins, polythiopolymercaptans, vinyl resins, polyolefins, synthetic rubbers, and the like, and mixtures thereof, and solid particles, such as particles of nylons, rayons, Dacrons, and the like. These and other materials are preferably employed in amounts less than 60% by weight of the polyepoxide, and more preferably not more than 50% by weight of the polyepoxide.

Other types of curing agents and activators, such as anhydrides, $BF_3$-complexes, polyhydric phenols, mercaptans and the like may also be included with the compositions.

As noted above, the polyepoxide compositions are stable at moderate temperatures, e.g., room temperature up to about 80° F., and are connected to insoluble products only at the elevated temperatures. Suitable temperatures in this case generally vary from about 150° F. to about 300° F. Preferred temperatures for dicyandiamide containing compositions vary from about 200° F. to 280° F.

The above process may be utilized in many important commercial applications. The process may be used, for example, in the formation of surface coatings, and particularly those requiring rapid cures as elevated temperature.

The above process is also applicable in lamination and filament winding applications. In this latter application, the sheets of fibrous material are impregnated with the mixtures of polyepoxide, dicyandiamide and imidazole compound. The impregnation is preferably accomplished by spreading the liquid mixture containing the above-noted components onto the sheet material as by dipping or otherwise immersing the sheets in the impregnant. The solvent is conveniently removed by evaporation and the mixture is cured to the fusible resin stage. The resinification can be arrested by cooling or other means. A plurality of the impregnated sheets are then superposed and the assembly is cured in a heated press under a pressure of about 25 to 500 or more pounds per square inch. The resulting laminate is extremely strong and resistant to the action of organic and corrosive solvents. The fibrous material used in the preparation of the laminates may be of any suitable material, such as glass cloth and matting, canvas and the like. It is usually preferred to utilize woven glass cloth that has been given prior treatment with well known finishing or sizing agents, therefore, such as methacrylate chronic or vinyl trichlorosilane.

As noted, the process of the invention is particularly suited for use as adhesives for bonding various types of materials together in a short period. The compositions may be used for bonding materials, such as glass-to-glass, metal-to-metal, glass-to-metal, wood-to-wood, and the like. They are particularly valuable as adhesives for bonding metal-to-metal or glass-to-glass. When applied to the desired surfaces to form films of various thicknesses, e.g., 5 mils to 30 mils and then the other surface superimposed and heat and pressure applied temperatures employed generally vary from about 150° F. to 300° F. Preferred temperatures vary from 200° F. to 300° F. The compositions are of value as adhesives for metal-to-metal bonding. In this case, it has been found advantageous to impregnate cotton, rayon, synethetic fiber or glass cloth textiles with the composition, and then use the impregnated textiles as a bonding tape for joining the metals. Such tapes provide convenient means for handling and using the compositions in adhesive applications. The tape is inserted between two metals to be joined, and the assembly is then heated to effect cure of the resin. A preferred tape for such use has a glass fiber textile impregnated with a mixture containing the polyepoxide, dicyandiamide, imidazole compound, silica, asbestos or aluminum powder. To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyether referred to by letter, such as Polyether A, are those disclosed in U.S. 2,633,458.

EXAMPLE I

This example illustrates the use of the process of the invention in curing Polyether A and the superior results obtained over those obtained by the use of the components by themselves.

Polyether A was stirred and heated at 250° F. with dicyandiamide alone, 2-ethyl-4-methylimidazole alone and with various concentrations of combinations of dicyandiamide and 2-ethyl-4-methylimidazole. Table I tabulates the resulting data.

A comparison of the results obtained in Table I clearly indicates the unexpected synergistic action that is obtained by using the dicyandiamide in combination with 2-ethyl-4-methylimidazole.

TABLE I

Synergistic effect of dicyandiamide 2-ethyl-4-methylimidazole mixtures in Polyether A

| Formulation | A | B | C | D | E |
|---|---|---|---|---|---|
| Polyether A | 100 | 100 | 100 | 100 | 100 |
| Dicyandiamide | 8 | 0 | 8 | 8 | 8 |
| 2-ethyl-4-methylimidazole | 0 | 1 | 1 | 0.5 | 0.1 |
| Gel time at 250° F | (1) | (2) | (3) | (4) | (5) |
| Working life at room temperature | (6) | (7) | (8) | (9) | (9) |
| Cure 1 hr./250° F., tensile shear strength [10]: | | | | | |
| 77° F | (11) | (12) | 2,880 | 3,440 | 3,450 |
| 250° F | | | 3,590 | 3,880 | 3,900 |
| 5 day aging at 77° F., tensile shear strength [10]: | | | | | |
| 77° F | | | 2,200 | 4,420 | 2,165 |
| 250° F | | | 2,940 | 5,025 | 2,625 |
| Cure 1 hr. at 350° F., tensile shear strength [10]: | | | | | |
| 77° F | 3,550 | | | | |
| 250° F | 3,550 | | | | |

[1] 16 hours. [2] 2 hours. [3] 8 minutes. [4] 10 minutes. [5] 45 minutes.
[6] Indefinitely. [7] Semi-solid in 5 days. [8] Workable after 5 days.
[9] Pourable after 5 days.
[10] Metal-metal lap shear specimens (MIL-A-8623 tested at 77° F. and 250° F.).
[11] Not cured. [12] Broke on saw.

As demonstrated above, the mixture of dicyandiamide and 2-ethyl-4-methylimidazole gives a system which cures at 250° F., and gives comparable and better strengths than dicyandiamide cures at 350° F. Furthermore, the mixture gives good bond strengths after aging 5 days at room temperature (77° F.) whereas the 2-ethyl-4-methylimidazole alone was so cured after 5 days aging that it would give no bond strength.

EXAMPLE II

This example illustrates the use of the mixture of Polyether A, dicyandiamide and 2-ethyl-4-methylimidazole as an adhesive for metal-to-metal bonding.

100 parts of Polyether A, 8 parts of dicyandiamide, 1 part of 2-ethyl-4-methylimidazole and 3 parts of finely divided silica. This mixture was spread between two sheets of aluminum metal and the assembly cured at 1 hour and 25 p.s.i. pressure. The properties of the resulting bond are as follows:

Tensile shear at (p.s.i.)
77° F.—3480
180° F.—3770
250° F.—2250

EXAMPLE III

This example illustrates the use of a mixture of dicyandiamide and 2-ethyl-4-methylimidazole lactate as curing agent for Polyether A.

100 parts of Polyether A was combined with 8 parts of dicyandiamide, 0.5 part of 2-ethyl-4-methylimidazole lactate and 3 parts finely divided silica. This mixture was stirred and cured at 250° F. The mixture gelled in 23 minutes while with the lactate salt by itself it took over 1½ hours to gell. When cured at 300° F., the mixture gelled in 4 minutes while the lactate salt by itself took over 1½ hours to gell.

EXAMPLE IV

This example illustrates the use of a mixture of dicyandiamide and imidazole as curing agent for Polyether A.

100 parts of Polyether A was combined with 8 parts of dicyandiamide, 0.5 part of imidazole, and 3 parts finely divided silica. This mixture was stirred and cured at 250° F. The mixture gelled in 23 minutes while with the imidazole by itself it took over 1½ hours to gell. Then cured at 300° F., the mixture gelled in 5 minutes while the imidazole by itself took over 1½ hours to gell.

EXAMPLE V

This example illustartes the use of a mixture of dicyandiamide and benzimidazole as curing agent for Polyether A.

100 parts of Polyether A was combined with 8 parts of dicyandiamide, 1 part of benzimidazole, and 3 parts finely divided silica. This mixture was stirred and cured at 250° F. The mixture gelled in 8 minutes while the benzimidazole by itself took over 3 hours.

EXAMPLE VI

Examples I to V are repeated with the exception that Polyether A is replaced with equivalent amounts of each of the following: Polyether B, Polyether C, diglycidyl resorcinol, diglycidyl ether of 2,2-bis(4-hydroxyphenyl)sulfone and N-diglycidyl aniline. Related results are obtained in each case.

EXAMPLE VII

Examples I-V are repeated with exception that the imidazole compound is replaced with equivalent amounts of each of the following: mercaptobenzimidazole, chlorobenzimidazole, methoxybenzimidazole, 2-amide-5-ethylimidazole, 2-ethyl-4-(2-ethyl-amino)-imidazole, 2-methyl-4-mercaptoethylimidazole, 2-butylacetate-5-methylimidazole and 2,5-chloro-4-ethylimidazole. Related results are obtained in each case.

I claim:
1. An adhesive composition comprising a mixture of 100 parts of weight of a polyepoxide, having more than one vic epoxy group 1 to 40 parts by weight of dicyandiamide and from 0.1 to 12 parts by weight of an imidazole compound having the formula:

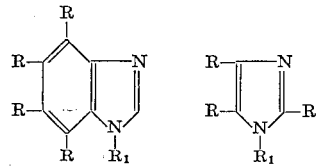

mixtures thereof and salts thereof selected from the group consisting of monocarboxylic acid salts and inorganic acid salts, wherein R is a member selected from the group consisting of hydrogen, halogen, hydrocarbon radicals, ester-substituted hydrocarbon radicals, mercaptan-substituted hydrocarbon radicals, amide-substituted hydrocarbon radicals and halogen-substituted hydrocarbon radicals and $R_1$ is a member of the group consisting of hydrogen and hydrocarbon radicals.

2. A composition as in claim 1 wherein the imidazole compound is selected from the group consisting of imidazole and benzimidazole.

3. A composition as in claim 1 wherein the polyepoxide is a glycidyl polyether of a polyhydric compound selected from the group consisting of polyhydric phenols and polyhydric alcohols.

4. A composition as in claim 3 wherein the glycidyl polyether of a polyhydric phenol is a glycidyl polyether of 2,2-bis(4-hydroxyphenyl)propane.

5. A composition as in claim 4 wherein the glycidyl polyether of 2,2 - bis(4 - hydroxyphenyl)propane has a molecular weight between about 250 and 900.

6. A composition as in claim 2 wherein the dicyandiamide is present in an amount of from 1 to 20 parts by weight and the imidazole compound is present in an amount of from 0.3 to 6 parts by weight.

7. A composition as in claim 1 wherein the imidazole compound is selected from the group consisting of 2-ethyl-4-methylimidazole and salts thereof.

References Cited
UNITED STATES PATENTS 3,356,645  12/1967  Warren _____ 260—47
3,438,937  4/1969  Christie _____ 260—47

WILLIAM H. SHORT, Primary Examiner

T. E. PERTILLA, Assistant Examiner

U.S. Cl. X.R.

117—124 E, 127, 138.8 F, 148, 161 ZB; 161—145, 185, 186; 260—2 N, 18 EP, 28, 37 EP, 59, 78.4 EP, 88.3 A, 94.2 R, 830 R, 831